United States Patent Office 3,195,727
Patented July 20, 1965

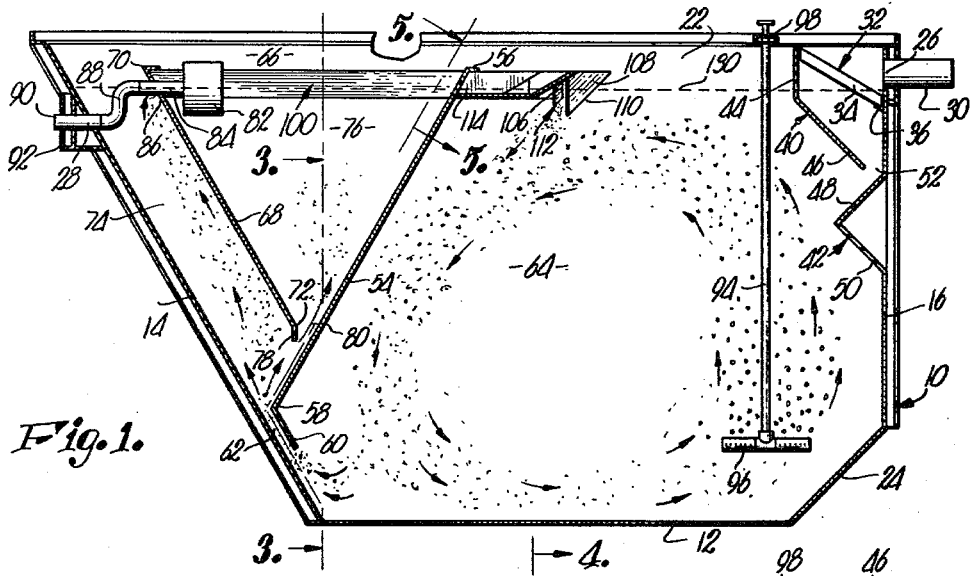

3,195,727
WASTE PRODUCTS TREATMENT APPARATUS HAVING FLOATING SOLID FEEDBACK STRUCTURE
Gary W. Kibbee, Kansas City, Kans., assignor to Union Tank Car Company, Chicago, Ill., a corporation of New Jersey
Filed Sept. 18, 1961, Ser. No. 138,894
9 Claims. (Cl. 210—195)

This invention relates to apparatus for treating waste products to permit discharge of the same into a stream or other disposal means, and is specifically directed to waste products treatment equipment having a waste disposal tank adapted to receive the substantially liquid waste products for decontaminating the same discharge into a stream or other suitable removal medium. Waste products such as domestic sewage and industrial wastes normally contain solid material which it is necessary to be processed so as to solubilize the normally insoluble wastes, or to divide the same into very fine particles which will remain substantially suspended in the liquid which is discharged from the treatment equipment.

Apparatus for treating waste products as defined normally, includes a tank wherein the products are subjected to a processing fluid which operates to oxidize or otherwise convert the solids to water soluble materials, or into relatively fine particles for discharge from the disposal tank. With reference to domestic sewage for example, it is necessary to treat the sewage with air to effect oxidation of the solids to either water soluble substances, or to reduce the materials to very fine particle size so that the same will remain substantially suspended in the effluent from the sewage disposal tank. Many of the solid particles in the sewage tend to float at the top of the tank because of the relatively lightweight of the particles, or the attachment of gas bubbles to the particles causing the same to become buoyant, and, therefore, problems have arisen with respect to preventing accumulation of buoyant materials on top of the liquid in the treatment tank.

It is, therefore, the primary object of the present invention to provide waste products treatment equipment wherein is included novel structure for preventing accumulation of buoyant particles on top of the liquid in the treatment tank and for assuring return of the buoyant particles to the main treatment section of the processing apparatus.

Although useful in various types of waste product treatment apparatus, the present structure is especially useful in equipment for processing industrial and domestic wastes, wherein the disposal tank is provided with a digestion basin and a settling basin in intercommunication and wherein is included novel means for returning buoyant solids collected on the top of the liquid in the settling basin to the digestion basin so that the buoyant particles may again undergo treatment to convert the same either into water soluble form or into very fine particles, whereby the same remain substantially suspended in the effluent from the tank and do not float on any of the treatment sections of the disposal equipment.

Also an object of the present invention is the provision of waste treatment apparatus wherein the disposal tank is provided with fluid diffusion means for introducing a treatment fluid into the substantially liquid waste material contained in the digestion basin of the tank to thereby effect conversion of the solids in the waste material either to waste soluble substances, or to reduce the particle size of the solids and with the fluid being directed into the waste material in a manner to cause circulatory flow of the liquid waste throughout the digestion basin of the tank, and wherein is included novel means for returning buoyant particles of the waste solids from the settling basin of the tank back into the digestion basin so that the particles may again be subjected to the treatment fluid. In this respect, another object of the invention is to provide equipment as described, wherein movement of buoyant particles from the settling basin to the digestion basin is in respnse to the circulatory flow of the liquid in the digestion basin, whereby movement of the buoyant particles is effected by the motion of the liquid in the digestion basin and thus negates the necessity of requiring a source of external power for returning the buoyant particles from the settling basin to the digestion basin.

Another object of the instant invention is the provision of means within the disposal tank as referred to above, wherein is included through structure interconnecting the settling basin with the digestion basin adjacent the upper extremities of the basins, whereby the buoyant particles of waste materials may be returned to the digestion basin from the settling basin by floating on the surface of the liquids in the basins as liquid is caused to flow from the settling basin through the trough structure into the digestion basin.

A further object of the invention is the provision of trough structure for returning buoyant particles of waste materials from the settling basin to the digestion basin, and wherein is included flow deflector means cooperable with the trough structure and positioned in the digestion basin for producing a zone of reduced pressure adjacent the outlet end of the trough structure and in response to circulatory flow of waste products in the digestion basin, whereby liquid is caused to flow from the settling basin into the digestion basin, thereby returning buoyant particles from the settling basin to the digestion basin as such particles float on the liquid flowing into the digestion basn through the trough structure from the settling basin.

A still further important object of the instant invention is the provision of waste products treatment apparatus having a waste disposal tank provided with baffle structure therein dividing the same into a digestion basin, a settling basin communicating with the digestion basin, and a clarified liquid basin between the digestion basin and the settling basin and communication with the latter, and wherein is included novel trough structure for directing buoyant particles of waste material, not only from the settling basin back into the digestion basin, but also from the clarified liquid basin into the digestion basin to assure maximum treatment of all of the solids in the waste products and materially increasing the efficiency of the treatment process.

Another important aim of the invention is the provision of flow control means between the clarified liquid basin and the digestion basin to regulate the velocity of the liquid returning to the digestion basin from the clarified liquid basin and carrying the buoyant particles therewith so that the return flow of liquid may be properly regulated to assure passage of all buoyant particles from the clarified liquid basin into the digestion basin, notwithstanding changes in the quantity of liquid effluent passing out of the clarified liquid basin through the control weir communicating with the outlet conduit leading from the clarified liquid basin of the tank. In this respect, a further important object of the invention is the provision of buoyant particles return structure as defined, wherein a flow control device may also be provided between the settling basin and the digestion basin if required in order to effectively control the velocity of fluid passing from the settling basin to the digestion basin to prevent build-up of buoyant particles in the settling basin under different flow rates of waste products into the disposal tank.

A still further object of the invention is the provision of liquid flow control means between the clarified liquid basin and the digestion basin to permit regulation of the flow of liquid back into the digestion basin so that excessive agitation of the liquid in the clarified liquid basin may be avoided. Whenever flow into the clarified liquid basin increases to a considerable extent, the flow control on the buoyant particle return trough may be adjusted to decrease the flow of liquid into the digestion basin from the clarified liquid basin, thereby minimizing agitation of the liquid in the clarified liquid basin.

Other objects of the present invention will become apparent as the following specification progresses, reference being had to the accompanying drawing, wherein:

FIGURE 1 is a cross-sectional view of a sewage disposal tank and illustrating the novel baffle structure therein which forms a part of the present invention, together with the trough structure which forms the remainder of the present invention:

FIG. 2 is a plan view of the sewage disposal tank illustrated in FIG. 1 and showing the relative positions of the trough structure for returning buoyant materials from the settling and clarified liquid basins to a digestion basin;

FIG. 3 is a cross-sectional view taken along line 3—3 of FIG. 1;

FIG. 4 is a cross-sectional view taken along line 4—4 of FIG. 2; and

FIG. 5 is an enlarged, fragmentary view of the flow control means operably associated with one of the baffles within the sewage disposal tank for regulating the flow of liquids from the clarified liquid basin to the digestion basin of the tank.

The sludge feedback structure of the present invention is especially adapted to be mounted on waste product treatment apparatus, and particularly on tanks adapted to treat domestic sewage and industrial wastes so that the effluent from the tank may be directed into a stream or other suitable removal medium.

For purposes of clarity, the preferred embodiment of the invention is shown and described as forming a part of a sewage disposal tank, but it is to be understood that the equipment has equal utility in the treatment of various types of waste products including industrial wastes and, therefore, it is not intended to be restricted to sewage treatment apparatus.

The sewage disposal tank illustrated herein, is provided with an inlet for receiving the sewage to be treated, as well as an outlet for directing the effluent from the tank to a suitable discharge medium. The sewage entering the tank is subjected to a digestion process within the main digestion section of the tank, whereby the solids in the sewage are converted either into water soluble form or into very fine particle size whereby the solids remain substantially suspended in the liquid effluent from the tank. In order to effect efficient digestion and break-up of the solids in the sewage, baffle structure is provided within the tank for dividing the latter into a digestion basin, a settling basin communicating with the digestion basin and spaced therefrom, and a clarified liquid basin between the settling basin and the digestion basin so that the sewage undergoing treament must pass successively through the digestion basin, the settling basin and thence into the clarified liquid basin for ultimate discharge from the tank. The settling basin is located in a position to act as a surge chamber so that the liquid directed into the clarified liquid basin is substantially free of solids which are settleable, and with most of the solids that have been directed into the tank being converted to water soluble form to present a relatively clear effluent passing out of the clarified liquid basin.

Means is provided for returning buoyant particles of sewage within the settling and clarified liquid basins to the digestion basin, said means including trough structure between the settling and digestion basins, and between the clarified liquid and digestion basins respectively. By virtue of the creation of a circulatory flow of sewage within the digestion basin by aeration apparatus disposed within the latter, liquids are caused to flow through the trough structures and into the digestion basin to carry the buoyant particles into the circulatory flow therein so that the particles may undergo the process of digestion.

Flow deflector means is operably coupled with the trough structure adjacent the circulatory flow to reduce the fluid pressure in the vicinity of the trough structure to create the flow of liquids in the settling and clarified liquid basins. Flow control means is provided in the trough structure between the clarified liquid and the digestion basin to limit the velocity of the liquid passing from the clarified liquid basin into the digestion basin so that return of buoyant materials from the clarified liquid basin to the digestion basin is assured, regardless of the flow rate of liquid into the clarified liquid basin.

A sewage tank broadly denoted by the numeral 10, is provided with a bottom wall 12, a pair of opposed end walls 14 and 16 extending upwardly from bottom wall 12, and a pair of side walls 18 and 20 spanning the distance between end walls 14 and 16 and secured to bottom wall 12.

Tank 10 is provided with a generally open top 22, but it is clear that means for covering top 22 may be provided to protect against the introduction of foreign materials into tank 10 in any manner other than the usual way. End wall 14 is inclined with respect to the vertical as is shown in FIG. 1, and end wall 16 is provided within an inclined, lowermost portion 24 adjacent to and secured to bottom wall 12.

Tank 10 is provided with an inlet 26 in the end wall 16 thereof, and an effluent outlet 28 in the end wall 14 thereof. Tank 10 is adapted to receive sewage therewithin through inlet 26, and a tube mounted with a grout box 30 communicates with inlet 26 and is adapted to be operably coupled with a source of sewage for directing the sewage toward and into tank 10.

A flume 32 in the nature of a plurality of parallel, inclined bars 34 are arranged across the inlet 26 in end wall 16 to collect particles of sewage of a size greater than a predetermined dimension so that the particles do not gravitate to the bottom of tank 10 until the same have been reduced in size. Bars 34 are operably coupled to the inner surface of end wall 16 by virtue of a channel member 36 below inlet 26, and the uppermost ends of bars 34 are secured to channel member 38 spanning the distance between side walls 18 and 20 at the uppermost margins of the latter.

A pair of baffles 40 and 42 are disposed below flume 32 to direct the sewage passing through the latter along a generally serpentine path. Baffle 40 is provided with a first portion 44 which is secured to channel member 38 in depending relationship thereto. An inclined portion 46 of baffle 40 is secured to portion 44 and extends downwardly and toward the inner surface of end wall 16.

Baffle 42 is transversely V-shaped and, like baffle 40, substantially spans the distance between side walls 18 and 20. Baffle 42 is provided with a pair of angularly disposed lengths 48 and 50 which project outwardly from end wall 16 and converge on a line within tank 10 spaced from end wall 16. Length 48 is spaced from the lowermost marginal edge of portion 46 to present a passageway 52 through which sewage passes as the same gravitates from flume 32 to bottom wall 12 of tank 10. Baffles 40 and 42 assist in reducing the particle size of the sewage, as well as to prevent the accumulation of sewage in one area on bottom wall 12. It is also apparent that baffles 40 and 42 serve to prevent air from diffusers 96 entering the inlet flume 32.

Baffle means is provided within tank 10 for dividing the latter into a plurality of chambers, and said baffle means includes a first baffle 54 which substantially spans the distance between side walls 18 and 20 and is provided with an upper marginal edge 56 and a lower marginal edge 58. First baffle 54 is generally inclined relative to the vertical with the edge 58 thereof in relatively close proximity to the inner surface of end wall 14 at a zone spaced above bottom wall 12. The upper marginal edge 56 of the first baffle 54 is disposed adjacent the open top 22 of tank 10 and in inwardly spaced relationship relative to end wall 14. An elongated flange 60 is secured to edge 58 and depends therefrom, flange 60 being in relatively close, parallel relationship to end wall 14 to present a narrow passageway 62 through which solid and liquid materials may flow.

First baffle 54 divides tank 10 into a pair of chambers 64 and 66, chamber 64 being in communication with inlet 26 to present a digestion basin for receiving the sewage to be converted either into water soluble products, or into very fine particle size for subsequent discharge through outlet 28 along with the liquid effluent.

A second baffle 68 is disposed within chamber 66 in angularly disposed relationship to first baffle 54. Second baffle 68 spans the distance between side walls 18 and 20 and is provided with an upper marginal edge 70 positioned at substantially the same height above bottom wall 12 as is marginal edge 56 of first baffle 54. Second baffle 68 is provided with a lower marginal edge 72 in relatively close proximity to the proximal face of first baffle 54 at a region spaced above the zone of intercommunication of chambers 64 and 66 adjacent passageway 62. Second baffle 68 is substantially parallel with end wall 14 and divides chamber 66 into a settling basin 74 and a clarified liquid basin 76. A flange 78 depends from and is secured to lower edge 72 of second baffle 68 to present a passageway 80 for intercommunicating settling basin 74 and clarified liquid basin 76.

Weir 82 is disposed within clarified liquid basin 76 and mounted on the innermost end of a tube 84 extending through an opening 86 in second baffle 68 adjacent the upper marginal edge 70 thereof. A flexible tube 88 interconnects tube 84 with a pipe 90 extending through the outlet 28, whereby liquids passing into weir 82 from clarified liquid basin 76, pass into tubes 84 and 88 and subsequently to pipe 90 for discharge from the latter. Grout box structure 92 connects pipe 90 to end wall 14 at the outer surface of the latter.

Aeration means in the form of a plurality of elongated conduits 94 is positioned within tank 10 adjacent the inlet 26 thereof and end wall 16. Conduits 94 extend into and terminate in vertically spaced relationship to bottom wall 12 and a perforated diffuser head 96 is provided for each conduit 94 at the lowermost end thereof. Conduits 94 are operably coupled with a transversely polygonal, air delivery manifold 98 spanning the distance between side walls 18 and 20 adjacent the top 22 of tank 10.

Manifold 98 is adapted to be operably coupled to a source of air under pressure external to tank 10 for delivering air to diffuser heads 96, and through the perforations thereof. Air under pressure is forced into digestion basin 64 and creates a circulatory flow of sewage denoted by the arrows in FIG. 1. As sewage enters the digestion basin 64 from inlet 26, liquid carrying solids suspended therein passes through passage 62 into the settling basin 74 where heavy particles sink to the bottom of basin 74 for re-entry into basin 64 while buoyant solids rise to the top of basin 74. Clarified liquid containing very fine particles suspended therein and some buoyant particles, pass upwardly through the passage 80 into the basin 76. It can be seen that the buoyant particles trapped in basins 74 and 76, rise to the surface of the liquids within these basins and remain there until removed. Particles which rise through passageways 62 and 80 are sufficiently heavy that the same are unable to rise to the surface of settling basin 74 and clarified liquid basin 76, eventually gravitate to bottom wall 12 through passageways 62 and 80.

Means is provided for removing the buoyant particles of sewage disposed on the upper surfaces of the liquids within settling basin 74 and clarified liquid basin 76, such means taking the form of trough structure adjacent the tops of the last-mentioned basins. To this end, a triangular portion is removed from each of the baffles 54 and 68 at the ends thereof adjacent the side walls 18 and 20. The resulting spaces present notches within which proximal ends of a pair of elongated stretches 100 are disposed. Each stretch 100 is formed from a strip of substantially rigid material and is provided with a normally lowermost, marginal edge 102 in engagement with and secured to the inner surface of the proximal side wall 18 or 20. The normally uppermost edge 104 of each stretch 100 is disposed inwardly of the proximal side wall 18 or 20, and above the lowermost edge 102 thereof to present a trough for the passage of liquid between the upper regions of settling basin 74 and the upper region of digestion basin 64. Weir 82 is preferably positioned within clarified liquid basin 76 so that the liquid level in tank 10 is generally above the lowermost edge 102 of each stretch 100. This permits buoyant particles of sewage contained within settling basin 74 to float on the surface of the liquid positioned within the troughs formed by stretches 100.

At the ends of stretches 100 adjacent digestion basin 64, a pair of deflector vanes 106 and 108 are provided, vane 106 being secured to the proximal end of stretch 100 and extending inwardly relative to tank 10 and rearwardly toward first baffle 54. Vane 108 is substantially triangular and is provided with a marginal edge 110 secured to the inner surface of the proximal side wall 18 or 20 to form with the corresponding vane 106, a passage 112 which is disposed to direct liquids at an angle relative to the direction of movement of the liquid through the troughs formed by stretches 100. Passages 112 direct liquids toward and into the circulatory flow created within digestion basin 64 by the flow of air under pressure out of diffuser head 96. Vanes 106 and 108 are positioned within the digestion basin 64 so that the flow of sewage within the latter is such as to create a region of reduced pressure in the vicinity of vanes 106 to thereby create a flow of liquid from settling basin 74, through the troughs formed by stretches 100, and into passages 112 for discharge into the flow created within digestion basin 64.

First baffle 54 is provided with an opening 114 therein intermediate the side edges thereof and spaced below the upper marginal edge 56 thereof. A transversely U-shaped channel member 116 is secured to first baffle 54 in communication with opening 114. Channel member 116 provides a trough extending into digestion basin 64 for the removal of buoyant particles of sewage contained within clarified liquid basin 76, which particles pass through opening 114 and into channel member 116.

A pair of deflector vanes 118 and 120 are disposed on each side of channel member 116 and form therebetween a passage 122 for the flow of liquid into digestion basin 64. Vanes 118 and 120 on each side of channel member 116, are positioned to direct the fluid flowing through channel member 116 along a path downwardly and toward first baffle 54 prior to the introduction thereof into the circulatory flow of sewage within digestion basin 64. Vanes 118 and 120, like vanes 106 and 108, are positioned so that the flow of sewage past vanes 118 and 120 is sufficient to reduce the fluid pressure in the vicinity of the latter. The reduction in fluid pressure creates a flow of liquid from clarified liquid basin 76 through opening 114 and into channel member 116. The flow then continues through passages 122 and then into the circulatory flow in digestion basin 64.

Control means is provided for regulating the flow of liquid through opening 114 in first baffle 54 and includes a gate 124 having a pair of substantially parallel slots 126 therein for receiving bolts 128 rigidly mounted to first baffle 54 and extending outwardly from the latter into clarified liquid basin 76. Gate 124 is therefore, shiftable relative to bolts 128 into and out of closing relationship with opening 114 to thereby regulate the flow of liquids through the latter. Although not illustrated in the preferred form of the invention, it is pointed out that flow control structure, similar to the flow control means in opening 114, is provided for regulating the flow of liquid through stretches 100.

In operation, sewage passes into tank 10 through inlet 26 thereof, through flume 32 and along a serpentine path defined by baffles 40 and 42. The sewage then gravitates to the bottom wall 12 of tank 10 and the latter fills generally to a level denoted by the dashed line 130 illustrated in FIG. 1. Air is then directed under pressure into conduits 94 from manifold 98 for discharge into digestion basin 64, through diffuser heads 96. The air entering digestion basin 64 creates the aforesaid circulatory flow to initiate the digestion process of the sewage to transform the same into water soluble products or to convert the solid to relatively fine particles, as the case may be. The digestion of the sewage within basin 64 is substantially aerobic and proceeds according to the following:

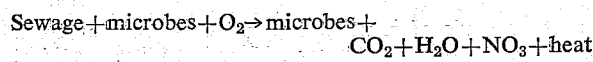

$$\text{Sewage} + \text{microbes} + O_2 \rightarrow \text{microbes} + CO_2 + H_2O + NO_3 + \text{heat}$$

The sewage, according to the above process, is transformed into carbon dioxide, water and nitrates. The carbon dioxide passes outwardly from tank 10 through the open top 22 thereof and the nitrates are water soluble and pass away with the water from the reaction into settling basin 74 and thence into clarified liquid basin 76 for discharge through outlet 28 from weir 82.

When fluid flows through passageways 62 and 80, some of the solid sewage particles are carried into basins 74 and 76. When this occurs, a second process may take place, namely, an aerobic process within settling basin 74 above passageway 62. This aerobic process proceeds according to the following:

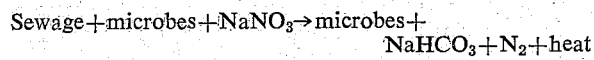

$$\text{Sewage} + \text{microbes} + NaNO_3 \rightarrow \text{microbes} + NaHCO_3 + N_2 + \text{heat}$$

According to the above process, the formation of the free nitrogen is due to the lack of oxygen within settling basin 74 and clarification basin 76. It is to be understood however, that nitrification will take place in basins 64 and 74 only when the dissolved oxygen in either basin is depleted. In the present apparatus, aerated liquid is substantially constantly maintained in basins 64 and 76 so that the possibility of nitrification of the solids is reduced. The free nitrogen, in the form of a gas, attaches to sewage particles and carries the same upwardly to the surface of the liquid within the settling basin 74 and clarification basin 76 where the particles remain buoyant on the surface of the liquid. By virtue of the flow of sewage within digestion basin 64, a flow of liquid is created within the troughs formed by stretches 100 and thereby, the buoyant particles of sewage within settling basin 74 are carried through the troughs and into digestion basin 64 through passages 112 and 122. Particles of sewage may also float to surface of the liquid in both settling and clarification basins 74 and 76 respectively, without the nitrification process described, e.g. particles of rubber and paper. The three buoyant particle devices will clear the surface of the liquids of these objects also.

Those particles of sewage which pass through passageway 80 and which are buoyant, rise to the surface of the liquid within clarified liquid basin 76 and flow outwardly through opening 114 under the action of liquid flow responsive to the flow of sewage within digestion basin 64. The flow control structure in basin 76 for regulating the liquid passing through passage 114 is especially useful to prevent excessive agitation of the liquid in clarification basin 76 when excessive quantities of liquid are flowing thereinto. When the opening into passage 114 is decreased, the agitation of clarified liquid in basin 76 is reduced, therefore, permitting maximum amounts of solids to gravitate from the liquid in basin 76. The clarified liquid basin 76, which also operates as a settling basin, is made more efficient as a settling basin by disposing the weir 82 in spaced relationship from passage 114, thereby assuring even distribution of the liquid in the clarification section of tank 10.

It is clear from the foregoing that means is provided for removing buoyant particles of sewage from the upper levels of settling and clarified liquid basins 74 and 76 respectively. Thus, the liquids removed from tank 10 through weir 82 and outlet 28, are substantially free of objectionable sewage particles to thereby assure that no nuisance is presented by products escaping from the plant, and further, to assure that the sewage is completely digested prior to the introduction of the waste products into a stream or the like.

The configuration of baffles 54 and 68 is such as to direct any particles which may pass through passageway 62 to the upper surface of settling basin 74. Thus, the action of the circulatory sewage flow within basin 64 is sufficient to remove the buoyant particles from basin 74 through the troughs formed by stretches 100. By virtue of the relatively small volume of liquid contained within passageways 62 and 80 compared with the relatively large volumes of basins 74 and 76, very little agitation takes place as the fluid flows through passageways 62 and 80 from digestion basin 64. This assures that particles of sewage are not intermixed with the liquids within basin 76 and, therefore, the effluent from this basin is substantially solid-free liquid.

Another important feature of the invention is the manner in which basin 74 acts as a surge chamber to prevent liquid containing untreated solids from being directed into the quiescent zone of basin 76 when large amounts of sewage are directed into basin 64 under considerable hydraulic pressure. Settled solids from basin 76 will pass downwardly through passage 80 and into basin 74 for flow through passage 62 in basin 64, or will be swept upwardly in basin 74 for return to basin 64 via the passages presented by stretches 100.

Having thus described the invention, what is claimed as new and desired to be secured by Letters Patent is:

1. In treatment apparatus for liquid carried solid waste comprising:
   (I) treatment tank means having upstanding wall portions and having a waste inlet and a waste outlet at predetermined levels that limit the uppermost surface level of liquid waste in said tank means,
   (II) means extending above said uppermost surface level and dividing said tank means into
      (A) a treatment chamber on one side thereof including said inlet, and
      (B) a settling chamber on the other side thereof including said outlet;
   (III) means establishing flow of waste in a first path in said treatment chamber generally along a face of said means extending above said uppermost surface level; and
   (IV) said means extending above said uppermost surface level substantially spanning said tank means above said uppermost surface level so as to prevent flowing waste in said treatment chamber from entering said settling chamber at said uppermost surface level;

the improvement in means for moving to said treatment chamber buoyant solid waste particles floating on the surface of the liquid in said settling chamber, comprising:
   (1) means providing communication through said means extending above said uppermost surface level between the upper surface layer of liquid in said treatment chamber and the upper surface layer of liquid in said settling chamber, (2) flow deflector means having a first surface facing said first flow path and a second surface shielded from said first flow path, said flow deflector means obscuring said means providing communication and being positioned on the side of said means extending above said uppermost surface level in said treatment chamber in said first flow path, (3) said means providing communication and said flow deflector means defining a generally horizontal passage interconnecting the upper surface layer of the settling chamber and the upper surface layer of the treatment chamber, (4) said flow deflector means having a portion spaced from a wall portion of said tank means to provide continuous communication at the upper surface layer between said generally horizontal passage and the upper surface layer of said treatment chamber which includes said first flow path, (5) and said means providing communication and said flow deflector means being so constructed and arranged as to cause said waste in said first flow path to impinge against said first surface of said flow deflector means so as to provide an area of reduced pressure in said treatment chamber adjacent said flow deflector means to draw buoyant solid waste particles floating on the upper surface layer of liquid in said settling chamber solely through said generally horizontal passage to the upper surface layer of the treatment chamber to cause said buoyant solid waste particles to be drawn into said first flow path in said treatment chamber, whereby such buoyant solid particles are subjected to treatment in said treatment chamber.

2. In waste treatment apparatus comprising:
(I) tank means having a bottom portion with wall portions extending upwardly therefrom,
(II) means for introducing liquid and solid waste into said tank means,
(III) discharge means including an outlet conduit at a predetermined level through one of said wall portions for limiting the uppermost surface level attained by liquid waste in said tank,
(IV) partition means
 (A) extending between said wall portions so as to divide said tank means into
  (1) a treatment chamber including said introducing means, and
  (2) a settling chamber including said discharge means, and
 (B) having a portion extending above said uppermost surface level that substantially spans said tank means between said wall portions so as to prevent waste in said treatment chamber from entering said settling chamber at said uppermost surface level,
(V) means defining a passage below said uppermost surface level establishing waste flow into said settling chamber below said uppermost surface level, and
(VI) means including treatment means in said treatment chamber causing waste flow in a first path generally along said partition means,
the improvement in means for moving to said treatment chamber buoyant solid waste particles floating on the surface of the liquid in said settling chamber comprising:
(a) said partition means having an opening through said portion extending above said uppermost surface level that permits flow between said treatment chamber and said settling chamber of the upper surface layer of liquid in said settling chamber,
(b) flow deflector means in said treatment chamber in said first flow path and including a first surface intercepting said first flow path and a second surface shielded from said first flow path, said second surface defining in part a generally horizontal passage communicating with said opening at said uppermost surface level and interconnecting the upper surface layer of said settling chamber and the upper surface layer of said treatment chamber, said flow deflector means having a portion spaced from one of said side wall portions so as to provide continuous communication at the upper surface layer between said generally horizontal passage and the upper surface layer of said treatment chamber communicating with said first flow path, (c) said opening and said flow deflector means being so constructed and arranged as to cause said waste in said first flow path to impinge against said first surface of said flow deflector means so as to provide a zone of reduced pressure on the treatment chamber side of said partition means adjacent said flow deflector means that draws buoyant solid waste particles floating on the upper surface layer of liquid in said settling chamber solely in a generally horizontal second flow path through said opening into said generally horizontal passage to cause said buoyant solid waste particles to be drawn into said first flow path in said treatment chamber, whereby such buoyant solid particles are subjected to treatment in said treatment chamber.

3. Apparatus as defined in claim 2 including means for varying the size of the opening in said partition means.

4. In waste treatment apparatus comprising:
(I) a tank having a bottom portion with end and side wall portions extending upwardly therefrom,
(II) means for introducing liquid and solid waste into said tank,
(III) discharge means including an outlet conduit at a predetermined level through one of said wall portions for limiting the uppermost surface level attained by liquid waste in said tank,
(IV) baffle means
 (A) extending between said side wall portions so as to divide said tank into
  (1) a treatment chamber including said introducing means, and
  (2) a settling chamber including said discharge means,
 (B) having a portion extending above said uppermost surface level, that substantially spans said tank between said side wall portions so as to prevent waste in said treatment chamber from entering said settling chamber at said uppermost surface level, and
 (C) being associated with means defining a passage below said uppermost surface level establishing waste flow from said treatment chamber to said settling chamber below said uppermost surface level, and
(V) means including treatment fluid releasing means in said treatment chamber adjacent said bottom for causing rising treatment fluid to induce waste to flow in a first path generally along said baffle means;
the improvement in means for returning to said treatment chamber for further treatment, buoyant solid waste particles floating on the surface of the liquid in said settling chamber comprising:
(a) said baffle means having an opening through said portion extending above said uppermost surface level that permits flow between said treatment chamber and said settling chamber of the upper surface layer of liquid in said settling chamber,
(b) flow deflector means having a first surface facing said first flow path and a second surface shielded from said first flow path, said flow deflector means being in said treatment chamber in said first flow path and obscuring said opening, said second surface defining in part a generally horizontal passage communicating with said opening at said uppermost surface level and interconnecting the upper surface layer of said settling chamber and the upper surface layer of said treatment chamber, (c) said flow deflector means having a portion extending above the surface of said liquid and a portion extending below the surface of said liquid, each of said portions of said flow deflector means defining an edge portion spaced from one of said side wall portions so as to provide continuous communication at the upper surface layer between said generally horizontal passage and the upper surface layer of said treatment chamber which includes said first flow path, (d) said opening and said flow deflector means being so constructed and arranged as to cause waste in said first flow path to impinge against said first surface of said flow deflector means so as to provide a zone of reduced pressure on the treatment chamber side of said baffle means adjacent said flow deflector means that draws buoyant solid waste particles floating on the upper surface layer of liquid in said settling chamber solely in a generally horizontal second flow path through said opening into said generally horizontal passage to cause said buoyant solid waste particles to be drawn into said first flow path in said treatment chamber, whereby such buoyant solid particles are again subjected to treatment in said treatment chamber.

5. In sewage treatment apparatus comprising:
(I) tank means having a bottom portion with end and side wall portions extending upwardly therefrom,
(II) means for introducing liquid and solid sewage into said tank means,
(III) discharge means including an outlet conduit at a predetermined level through one of said wall portions for limiting the uppermost surface level attained by liquid in said tank means,
(IV) baffle means
  (A) having its lower extremity adjacent said bottom portion,
  (B) extending between said side wall portions so as to divide said tank means into
    (1) a treatment chamber including said sewage introducing means, one of said end wall portions defining in part said treatment chamber, and
    (2) a settling chamber including said discharge means, and
  (C) having a portion extending above said uppermost level that substantially spans said tank means between said side wall portions so as to prevent sewage in said treatment chamber from entering said settling chamber at said uppermost surface level, and
(V) means including air releasing means in said treatment chamber adjacent said bottom and spaced away from said baffle means toward said one end wall portion so that rising air released therefrom causes sewage in said tank to flow in a first path generally toward and along said baffle means, the improvement in means for returning to said treatment chamber buoyant solid particles floating on the surface of the liquid sewage in said settling chamber comprising:
(a) said baffle means having an opening through said portion extending above said uppermost surface level that permits flow between said treatment chamber and said settling chamber of the upper surface layer of liquid in said settling chamber,
(b) flow deflector means in said treatment chamber having a first surface facing said first flow path and a second surface shielded from said first flow path, said flow deflector means extending at an angle to said baffle means in said first flow path and obscuring said opening, said second surface defining in part a generally horizontal passage communicating with said opening at said uppermost surface level and interconnecting the upper surface layer of said settling chamber and the upper surface layer of said treatment chamber, (c) said flow deflector means having a portion spaced from said baffle means and extending above the surface of said liquid and another portion spaced from said baffle means and extending below the surface of said liquid, each of said portions of said flow deflector means defining an edge portion spaced from one of said side wall portions so as to provide continuous communication at the upper surface layer between said generally horizontal passage and the upper surface layer of said treatment chamber which includes said first flow path, (d) said opening and said flow deflector means being so constructed and arranged as to cause sewage in said first flow path to impinge against said first surface of said flow deflector means so as to provide a zone of reduced pressure on the treatment chamber side of said baffle means adjacent said flow-deflector means that draws buoyant solid particles floating on the upper surface layer of liquid in said settling chamber solely in a generally horizontal second flow path generally opposite to said first flow path through said opening into said passage to cause said buoyant solid waste particles to be drawn into said first flow path in said treatment chamber, whereby such buoyant solid particles are again subjected to treatment in said treatment chamber.

6. In sewage treatment apparatus comprising:
(I) tank means having a bottom portion with wall portions extending upwardly therefrom,
(II) means for introducing liquid and solid sewage into said tank means,
(III) discharge means including an outlet conduit at a predetermined level through one of said wall portions for limiting the uppermost surface level attained by liquid sewage in said tank means,
(IV) baffle means
  (A) extending between said wall portions so as to divide said tank means into
    (1) a treatment chamber including said introducing means, and
    (2) a settling chamber including said discharge means, and
  (B) having a portion extending above said uppermost surface level, and
(V) means causing sewage to flow in said treatment chamber in a first path generally along said baffle means, the improvement in means for moving to said treatment chamber buoyant solid particles floating on the surface of the liquid sewage in said settling chamber comprising:
(a) said baffle means having an opening in said portion extending above said uppermost surface level that permits flow between said treatment chamber and said settling chamber of the upper surface layer of liquid in said settling chamber,
(b) trough means communicating with and extending from said opening into said treatment chamber beyond said baffle means,
(c) flow deflector means having a first surface facing said first flow path and a second surface shielded from said first flow path, said flow deflector means being ahead of said trough means in said first flow path and obscuring said trough means,
(d) said opening, said trough means, and said flow deflector means being so constructed and arranged as to cause sewage in said first flow path to impinge against said first surface of said flow deflector means so as to provide a zone of reduced pressure on the treatment chamber side of said trough means that draws buoyant solid particles floating on the upper surface layer of liquid in said settling chamber in a generally horizontal second flow path through said opening into said first flow path, whereby such buoyant solid particles are subjected to treatment in said treatment chamber.

7. Apparatus as defined in claim 6 wherein:
(A) said opening in said baffle means is spaced inwardly from said wall portions;
(B) said trough means is supported by said baffle means, and
(C) said flow deflector means is supported by said trough means.

8. Apparatus as defined in claim 6 wherein:
(A) said opening in said baffle means is adjacent one of said wall portions;
(B) said trough means is defined in part by means attached to said one wall portion, and defined in part by said one wall portion, and
(C) said flow deflector means is supported by said one wall portion.

9. In treatment apparatus for liquid carried solid waste comprising:
(I) treatment tank means having a waste inlet and a waste outlet at predetermined levels that limit the uppermost surface level of liquid waste in said tank means,
(II) means extending above said uppermost surface level and dividing said tank means into
(A) a treatment chamber on one side thereof including said inlet, and
(B) a settling chamber on the other side thereof including said outlet;
(III) means establishing flow of waste in a first path in said treatment chamber generally along a face of said means extending above said uppermost surface level; and
(IV) said means extending above said uppermost surface level substantially spanning said tank means above said uppermost surface level so as to prevent flowing waste in said treatment chamber from entering said settling chamber at said uppermost surface level;

the improvement in means for moving to said treatment chamber buoyant solid waste particles floating on the surface of the liquid in said settling chamber, comprising:
(1) means providing communication through said means extending above said uppermost surface level between the upper surface layer of liquid in said treatment chamber and the upper surface layer of liquid in said settling chamber,
(2) flow deflector means having a first surface facing said first flow path and a second surface shielded from said first flow path, said flow deflector means obscuring said means providing communication and being positioned on the side of said means extending above said uppermost surface level in said treatment chamber in said first flow path,
(3) said means providing communication including an opening in said means extending above said uppermost surface level and trough means at least partially surrounding said opening, said trough means being supported by said means extending above said uppermost surface level,
(4) said trough means protruding ahead of said means extending above said uppermost surface level into said treatment chamber,
(5) said flow deflector means being ahead of and obscuring said trough means, and
(6) said means providing communication and said flow deflector means being so constructed and arranged as to cause said waste in said first flow path to impinge against said first surface of said flow deflector means so as to provide an area of reduced pressure in said treatment chamber adjacent said flow deflector means drawing buoyant solid waste particles floating on the upper surface layer of liquid in said settling chamber in a generally horizontal second flow path through said means providing communication into said first flow path in said treatment chamber, whereby such buoyant solid particles are subjected to treatment in said treatment chamber.

References Cited by the Examiner

UNITED STATES PATENTS

| | | | |
|---|---|---|---|
| 166,508 | 8/75 | Daschbach | 261—123 |
| 1,314,955 | 9/19 | Flicker | 210—14 X |
| 2,267,608 | 12/41 | Hawley | 210—83 |
| 2,285,697 | 6/42 | Durdin | 210—195 |
| 2,428,756 | 10/47 | Lind | 210—525 |
| 2,435,898 | 2/48 | Otto | 261—123 X |
| 2,574,685 | 11/51 | Baxter et al. | 210—195 |
| 2,708,520 | 5/55 | Dallas | 210—525 |
| 2,886,175 | 5/59 | Kalinske | 210—219 |
| 2,987,186 | 6/61 | Burgoon et al. | 210—15 |
| 3,161,590 | 12/64 | Weiss et al. | 210—221 |

REUBEN FRIEDMAN, *Primary Examiner.*

HERBERT L. MARTIN, CHARLES SUKALO,
*Examiners.*